United States Patent
Raam et al.

(10) Patent No.: US 11,658,715 B2
(45) Date of Patent: May 23, 2023

(54) ANTENNA DIVERSITY SYSTEM AND METHOD FOR AN INFORMATION HANDLING SYSTEM (IHS)

(71) Applicant: Dell Products, L.P., Round Rock, TX (US)

(72) Inventors: Suresh Raam, Cedar Park, TX (US); Lars Fredrik Proejts, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 68 days.

(21) Appl. No.: 17/187,920

(22) Filed: Mar. 1, 2021

(65) Prior Publication Data

US 2022/0278720 A1    Sep. 1, 2022

(51) Int. Cl.
| | | |
|---|---|---|
| *H04B 7/06* | (2006.01) | |
| *H04B 17/309* | (2015.01) | |
| *H04W 76/10* | (2018.01) | |
| *H01Q 1/38* | (2006.01) | |

(52) U.S. Cl.
CPC .............. *H04B 7/0608* (2013.01); *H01Q 1/38* (2013.01); *H04B 17/309* (2015.01); *H04W 76/10* (2018.02)

(58) Field of Classification Search
CPC .. H04B 7/0608; H04B 17/309; H04B 7/0602; H04B 7/0413
See application file for complete search history.

(56) References Cited

U.S. PATENT DOCUMENTS

| | | | | |
|---|---|---|---|---|
| 2012/0094622 | A1* | 4/2012 | Yen | H04B 7/0874 455/277.1 |
| 2012/0325985 | A1* | 12/2012 | Slowinski | F16M 11/08 248/121 |
| 2013/0309981 | A1* | 11/2013 | Ngai | H04B 7/0608 455/78 |
| 2017/0201289 | A1* | 7/2017 | Zhang | H04W 72/085 |
| 2017/0329364 | A1* | 11/2017 | Kim | F16M 11/10 |
| 2020/0271747 | A1* | 8/2020 | Wu | G01P 15/18 |
| 2021/0075094 | A1* | 3/2021 | Da Costa Bras Lima | H02J 50/10 |
| 2021/0135712 | A1* | 5/2021 | Hong | H04B 7/0404 |

* cited by examiner

*Primary Examiner* — Aristocratis Fotakis
(74) *Attorney, Agent, or Firm* — Fogarty LLP

(57) ABSTRACT

According to one illustrative, non-limiting embodiment, an IHS may include computer-executable instructions for receiving first and second signal quality measurements from first and second antennas disposed at a first and second locations, respectively, in a housing of an IHS in which the first location is distally separated from the second location. The instructions then select one of the first or second antennas according to the first or second signal quality measurement, and establish a first wireless communication link with a remote device using the selected first or second antennas.

18 Claims, 5 Drawing Sheets

ANTENNA DIVERSITY SYSTEM AND METHOD FOR AN INFORMATION HANDLING SYSTEM (IHS)

FIELD

The present disclosure relates generally to Information Handling Systems (IHSs), and more particularly, to a system and method for an information handling system (IHS).

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communications via a network to a server IHS to retrieve and store information. For example, a client IHS may communicate with a network through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface). Modern WLAN protocols include the use of multiple bands. Generally speaking, a band refers to a small contiguous section of the radio-frequency (RF) spectrum that provides a channel for communication. In the particular case of one used by the multi-band simultaneous device, a band may be those used by a Wi-Fi protocol based on the IEEE 802.11 family of standards, such as a 2.4 GHz band, a 5 GHz band, and/or a 60 GHz band.

The Wi-Fi specification includes a family of IEEE 802.11 standards that are augmented at an ongoing basis to enhance the capabilities of the Wi-Fi specification. Starting with the 802.11n standard, Wi-Fi standards include simultaneous dual-band 2.4 GHz and 5 GHz support as a standard feature. By supplying separate wireless interfaces for each band, dual-band 802.11n access points (e.g., routers) may provide relatively good flexibility when setting up a network.

Some home devices require legacy compatibility and greater signal reach that the 2.4 GHz band offers, while others may require the additional network bandwidth that the 5 GHz band offers. Access points having multi-band simultaneous capabilities may provide connection links designed for the needs of each. For example, many Wi-Fi home networks suffer from wireless interference arising from the prevalence of 2.4 GHz consumer gadgets, like cordless phones, which utilize Frequency Hopping Spread Spectrum modulation where the signal continually jumps around the 2.4 GHz spectrum rather than using a single channel. Microwave ovens may also interfere with wireless signals due to the radio signals they 'leak' during operation. The ability to use the 5 GHz band on a router avoids these problems because the technology can support 23 non-overlapping channels in many cases.

SUMMARY

According to one illustrative, non-limiting embodiment, an IHS may include computer-executable instructions for receiving first and second signal quality measurements from first and second antennas disposed at a first and second locations, respectively, in a housing of an IHS in which the first location is distally separated from the second location. The instructions then select one of the first or second antennas according to the first or second signal quality measurement, and establish a first wireless communication link with a remote device using the selected first or second antennas.

According to another embodiment, an IHS-based method includes receiving a first signal quality measurement from a first antenna disposed at a first location in a housing, and a second signal quality measurement from a second antenna disposed at a second location in the housing in which the first location is distally separated from the second location. The method then selects one of the first or second antennas according to the first or second signal quality measurement, and establishes a wireless communication link with a remote device using the selected first or second antennas.

According to yet another embodiment, a memory storage device of an IHS may include instructions for receiving first and second signal quality measurements from first and second antennas disposed at a first and second locations, respectively, in a housing of an IHS in which the first location is distally separated from the second location. The instructions then select one of the first or second antennas according to the first or second signal quality measurement, and establish a first wireless communication link with a remote device using the selected first or second antennas.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1A:
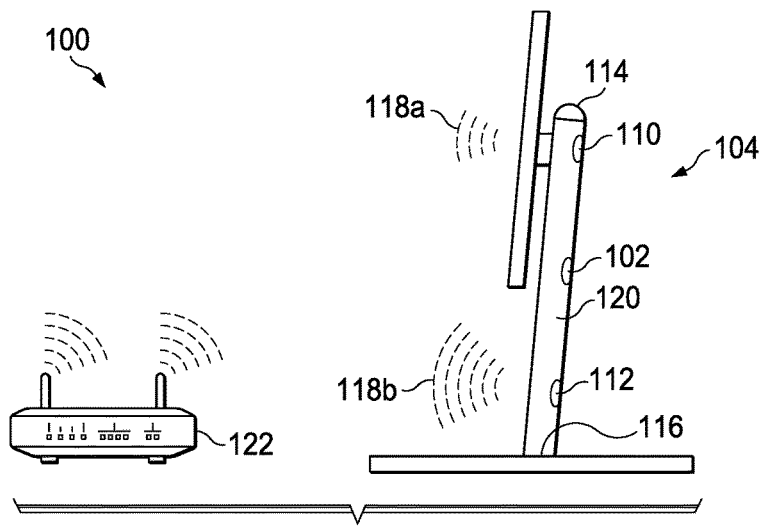
FIGS. 1A and 1B illustrate an example AIO computer that is configured with an antenna diversity system to provide a solution to the aforementioned problems according to one embodiment of the present disclosure.

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Today's users now interact with IHSs on a daily basis. Personal computers, which comprise a particular type of IHS, are continually trending towards smaller and lighter form factors. For example, all-in-one (AIO) desktop computers have been implemented in which at lease a portion of its resources (e.g., central processing units (CPUs), graphics processing units (GPUs), communication resources (e.g., universal serial bus (USB) interfaces, Ethernet devices, etc.), storage, etc.) are integrated inside of its monitor housing, thus occupying a relatively smaller footprint, and with fewer cables, than other desktop counterparts that house their resources in a separate housing, such as a tower.

AIO personal computers bridge the gap between desktop workstations (e.g., towers) and notebook computers. In many cases, AIO computers can provide a direct replacement for desktop workstations based upon how they are used. In general, AIO computers require less desktop space (e.g., smaller footprint), are easier to transport, and easier to setup given that some, most, or all resources (e.g., CPU, GPU, storage, power, communications, etc.) of the AIO computers are integrated in a single housing.

The advantages of AIO computers also come with certain drawbacks that include increased upgrade complexity particularly with regard to the monitor upon whose configuration the AIO computer is based. Additionally, because the resources come pre-configured inside the monitor and/or its associated monitor stand, physical placement of its resources becomes an important aspect of how well these AIO computers achieve their goals of reduced size and weight.

One particular complexity involved with AIO computer design exists in wireless devices that are often configured in most currently implemented IHS designs for personal use. AIO form factors may reduce overall size by integrating WLAN systems within its monitor stand. Current monitor stands implemented with AIO form factors, however, are provided with movable monitors that can be slid upwards and downwards relative to the monitor stand and in some cases, be tilted (e.g., rotated up or down), swiveled left and right, and pivoted horizontal (e.g., landscape view mode) or vertical (e.g., portrait view mode). While such movement may be beneficial for users, it often creates problems for Wi-Fi antennas whose position within the monitor stand has been fixed. That is, the physical position of the monitor relative to the monitor stand may obstruct the radiation pattern of Wi-Fi antennas based on how the user positions the monitor. For example, conventional AIO form factors having fixed Wi-Fi antenna positions often require additional power from other wireless link devices (e.g., access points (APs)) to maintain its reliability when the monitor is positioned in a manner to obstruct the radiation pattern of Wi-Fi antennas configured in AIO computers. Additionally, not having the right set of hardware could result in a compromised wireless function.

Figure 1B:
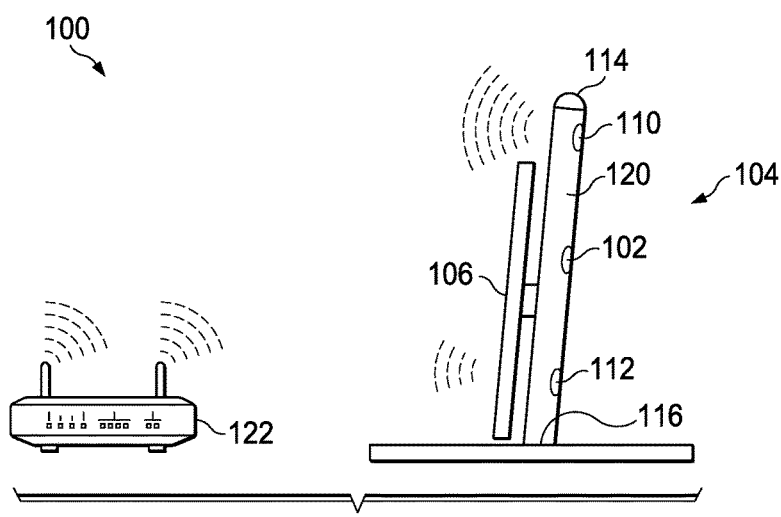

FIGS. 1A and 1B illustrate an example AIO computer 100 that is configured with an antenna diversity system 102 to provide a solution to the aforementioned problems according to one embodiment of the present disclosure. The AIO computer 100 that in this particular example embodiment, includes a monitor stand 104 that supports a monitor 106. The antenna diversity system 102 is configured in the monitor stand 104 and includes at least two antennas 110 and 112 configured on the monitor stand 104. While one antenna 110 is shown configured proximate a top 114 of the monitor stand 104, and a second antenna 112 is shown proximate a bottom 116 of the monitor stand 104, it should be appreciated that the antennas 110, 112 can be disposed at any suitable distally separated position from one another.

As best shown in FIG. 1A in which the monitor 106 is positioned near an upper travel region of the monitor stand 104 such that a radiation pattern 118a generated by the first antenna 110 is partially obstructed from a nearby access point (AP) 122, while a second radiation pattern 118b generated by the second antenna 112 is generally not obstructed as much from a nearby AP 122, thus providing a relatively clear path for communicating with the AP 122. Conversely as shown in FIG. 1B in which the monitor 106 is positioned near a lower travel region of the monitor stand 104 such that the radiation pattern 118a generated by the first antenna 110 provides a relatively clear path to the AP 122, while the radiation pattern 118b generated by the second antenna 112 is now partially obstructed from the AP 122. According to embodiments of the present disclosure, the antenna diversity system 102 provides an antenna selection scheme in which both antennas 110, 112 are continually monitored so that one of the antennas 110, 112 may be selected for providing a communication link with the AP 122 having the optimum radiation pattern.

In general, the AIO computer 100 is a particular type of IHS with a form factor in which some, most, or all resources, such as CPU resources, GPU resources, storage resources, communication resources (e.g., Ethernet, USB, etc.), and/or various platform resources (e.g., communication systems, peripheral devices, power/thermal control systems, etc.) are disposed inside of the monitor stand 104. In some cases, those resources are accessible from a removable rear cover 120 configured on the monitor stand 104. AIO computers 102 achieve their relatively small size (e.g., footprint) due in large part, to their use of a monitor stand 104 to not only support a monitor 106, but also to function as a housing for some, most, or all of its resources. This configuration, nevertheless, has yielded several drawbacks. In many cases, for example, the monitor is constrained within an adjustable position that can at least partially hinder a radio frequency (RF) radiation pattern of one of the first or second antennas. Thus, placement of any wireless communication antennas inside of the monitor stand 104 can often cause communication problems with other wireless communication devices, such as APs 122. According to embodiments of the present disclosure, redundant, distally separated antennas are provided for each operating band of a wireless communication system of an AIO computer 100 so that the inherent challenges involved with providing wireless communication link using IHSs, such as AIO computer 100 can be reduced or eliminated.

Although embodiments of the present disclosure are described herein as directed to an AIO computer, it is contemplated that other embodiments may involve any computer device whose physical form factor involves components having physical characteristics that may obstruct optimal RF propagation of its wireless communication (e.g., Wi-Fi) sub-system under certain circumstances. That is, it is contemplated that the teachings of the present disclosure may be extended to other physical form factors whose resources may be configured in a constrained relationship such that wireless communication with other devices may become hindered by the constrained placement of certain resources relative to the antennas that provide the wireless communications.

Figure 2:
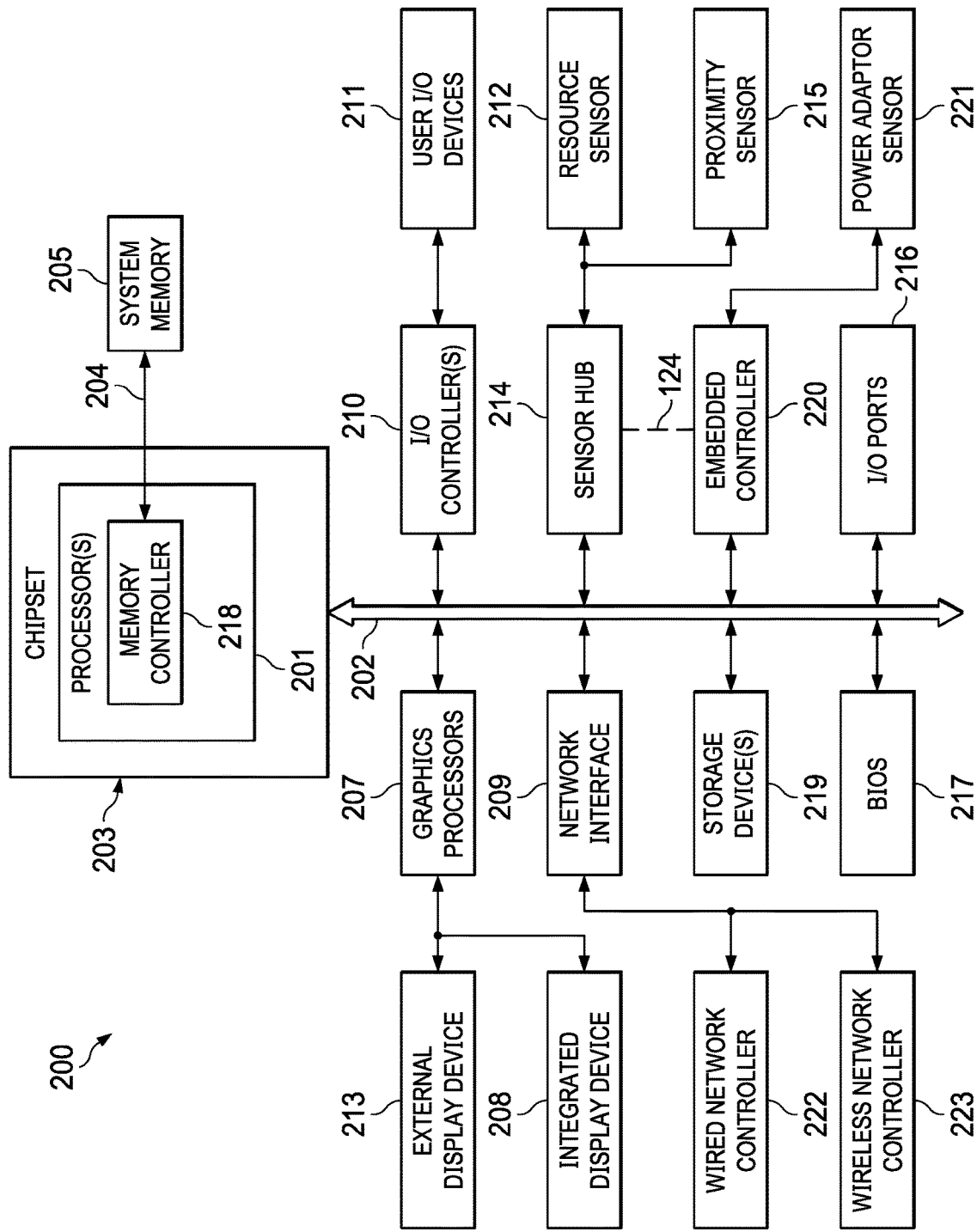
FIG. 2 is a block diagram illustrating the various resources of an example IHS that may be included in whole, or in part, within the monitor stand of the AIO computer according to one embodiment of the present disclosure.

FIG. 2 is a block diagram illustrating the various resources of an example IHS 200 that may be included in whole, or in part, within the monitor stand 104 of AIO computer 100 according to one embodiment of the present disclosure. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit (VC) bus or other suitable type of bus connection. Sensor hub 214 may also utilize an I²C bus for communicating with various sensors supported by AIO computer 100.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
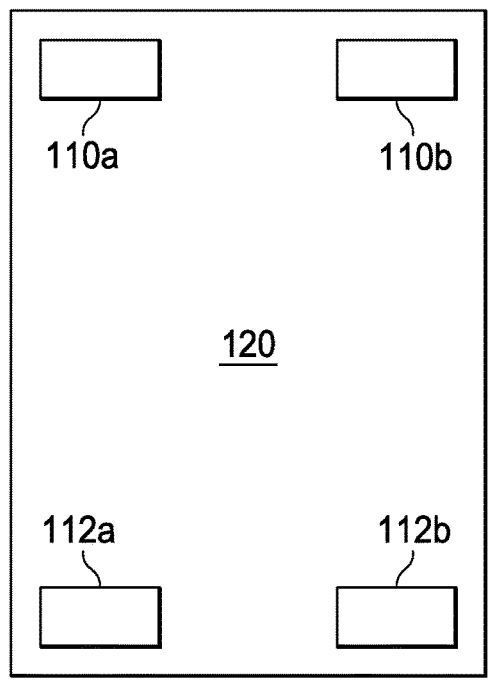
FIG. 3 illustrates an example rear cover that has been removed from the monitor stand in order to reveal the arrangement of antennas of the antenna diversity system according to one embodiment of the present disclosure.

FIG. 3 illustrates an example rear cover 120 that has been removed from the monitor stand 104 in order to reveal the arrangement of antennas of the antenna diversity system 102 according to one embodiment of the present disclosure. As shown, each of the antennas 110, 112 comprise two antennas 110a, 110b and 112a, 112b, respectively. Each of these two antennas 110a, 110b and 112a, 112b are designed to convey radio frequency (RF) signals at their respective operating bands. That is, antenna 110a, 110b are sized to convey RF signals at a first operating band, while antennas 112a, 112b are sized to convey RF signals at a second operating band.

The antennas 110a, 110b and 112a, 112b generally comprise electrically conductive radio-frequency (RF) resonators that convert RF energy to and from electrical signals to be processed by one or more wireless communication modules, which will be described in detail herein below. The antennas 110a, 110b and 112a, 112b may be formed on the rear cover 120 using any suitable manufacturing process. In one embodiment, the antennas 110a, 110b and 112a, 112b are formed on a printed circuit board (e.g., FR4), which are then fixedly or removably attached to the rear cover 120. In another embodiment, the antennas 110a, 110b and 112a, 112b are integrally formed on the rear cover 120 using a metallic deposition process, such as a laser direct structuring (LDS) process. The LDS process uses a thermoplastic material, doped with a (non-conductive) metallic inorganic compound activated by means of a laser. The laser writes the shape of the antennas 110a, 110b and 112a, 112b on rear cover 120 to form a micro-rough track. The micro-rough track then receives a metallization layer that forms the antennas 110a, 110b and 112a, 112b.

As shown, each of the first and second sets of antennas 110a, 110b and 112a, 112b includes two antenna elements. Nevertheless, each set of antennas 110a, 110b and 112a, 112b may include any quantity of antenna elements based upon the quantity of bands used by the wireless communication module. A band refers to a small contiguous section of the radio-frequency (RF) spectrum that provides a channel for communication. In the particular case of one used in the present example embodiment, a band may be those used by a Wi-Fi protocol based on the Institute of Electrical and Electronics Engineers (IEEE) 802.11 family of standards, such as a 2.4 GHz band, and a 5 GHz band, thus requiring two antennas 110a, 110b and 112a, 112b for each set. Nevertheless, it should be understood that the quantity and configuration of antennas 110a, 110b and 112a, 112b may vary based on the wireless technology used. For example, the quantity and configuration of antennas 110a, 110b and 112a, 112b may be based on the 802.16 (WiMAX) standard or the International Telecommunication Union (ITU) TIA-856 (i.e., Evolution-Data Optimized (EV-DO)) standard. Other wireless telecommunication standards may exist that direct the quantity and configuration of each set of antennas 110, 112 on the rear cover 120.

Figure 4:
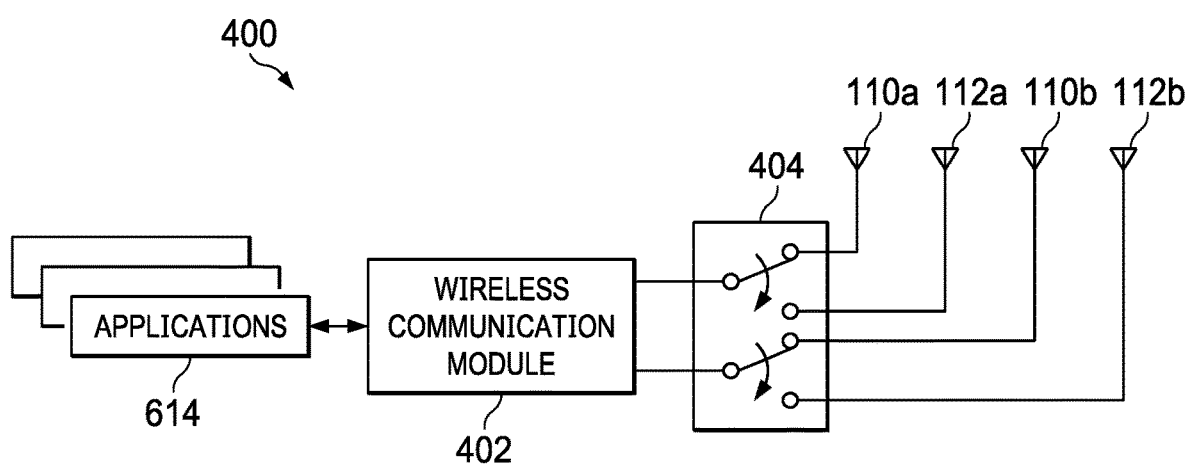
FIG. 4 is a diagram illustrating an example antenna diversity system that may be implemented in the AIO computer according to one embodiment of the present disclosure.

FIG. 4 is a diagram illustrating an example antenna diversity system 400 that may be implemented in the AIO computer 100 according to one embodiment of the present disclosure. The antenna diversity system 400 includes a wireless communication module 402 that is electrically coupled to the antennas 110a, 110b and 112a, 112b through a switch assembly 404, The wireless communication module 402 is controlled to select between either the first or third antennas 110a, 112a for optimizing reception of a first communication band, and select between either the second or fourth antennas 110b, 112b for optimizing reception of a second communication band (e.g., 5.0 GHz). The output of the wireless communication module 402 may be fed to one or more applications 614 installed on the AIO computer 101 to be used thereby.

The wireless communication module 402 may be any type that performs wireless communication with the AP 122 by demodulating electrical signals received from the antennas 110 to generate electrical signals used by applications 614, and modulating electrical signals transmitted from the applications 614 to generate RF signals that are transmitted through the antennas 110. In one embodiment, wireless communication module 402 functions according to a Wi-Fi protocol that communicates via the 2.4 GHz and 5.0 GHz bands, thus requiring two sets of antennas 110, 112 for each.

The switch assembly 404 generally includes a pair of two-pole, double-throw (SPDT) switches that may be independently controlled to select either antenna used for the first band of operation (e.g., first or second antenna 110a, 112a), or the second band of operation (e.g., second or fourth antenna 110b, 112b). For example, the switch assembly 404 may be controlled by the wireless communication module to select the first antenna 110a for the first band of operation, while selecting the third antenna 110a for the second band of operation. The switch assembly 404 may also be controlled by the wireless communication module 404 to select the first antenna 110a for the first band of operation, while selecting the fourth antenna 112b for the second band of operation. The switch assembly 404 may also be controlled by the wireless communication module 404 to select the second antenna 112a for the first band of operation, while selecting the third antenna 110b for the second band of operation. The switch assembly 404 may also be controlled by the wireless communication module 404 to select the second antenna 112a for the first band of operation, while selecting the fourth antenna 112b for the second band of operation.

Although the switch assembly 404 is shown providing a 4:2 diversity selection mechanism (e.g., two antenna redundancy scheme for each of two communication bands), it should be appreciated that the switch assembly 404 may have a configuration that provides any desired diversity selection mechanism, such as a 6:2 diversity selection mechanism (e.g., three antenna redundancy scheme for each of two communication bands), a 6:3 diversity selection mechanism (e.g., two antenna redundancy scheme for each of three communication bands), and so on. Other diversity selection mechanisms exist and can be used.

Figure 5:
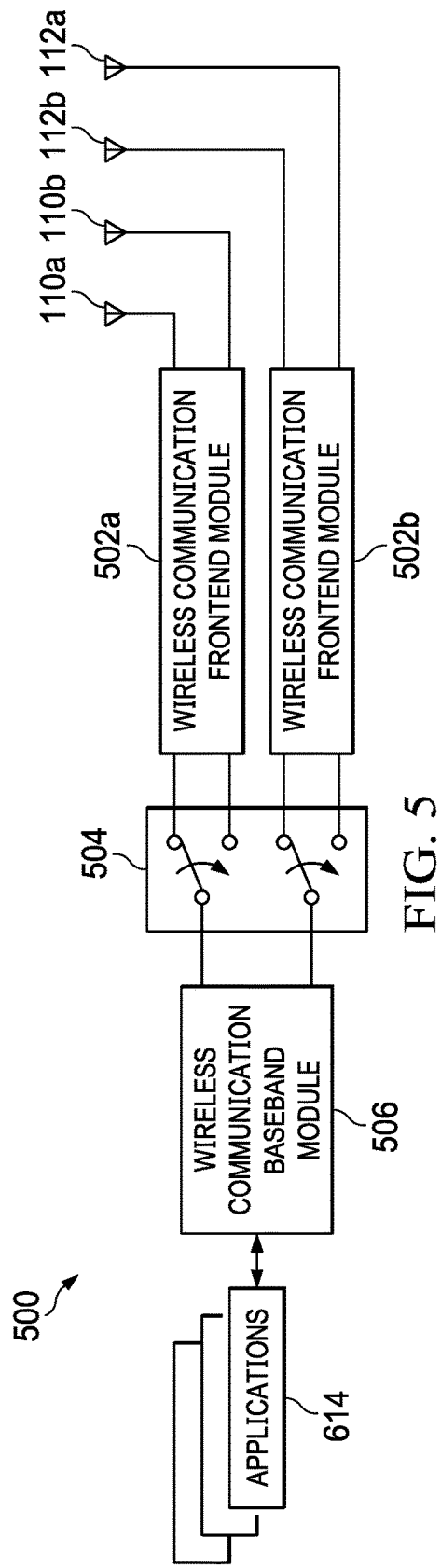
FIG. 5 is a diagram illustrating another example antenna diversity system that may be implemented in the AIO computer according to one embodiment of the present disclosure.

FIG. 5 is a diagram illustrating another example antenna diversity system 500 that may be implemented in the AIO computer 100 according to one embodiment of the present disclosure. The antenna diversity system 500 includes two wireless communication frontend modules 502a, 502b in which a first wireless communication module 502a is electrically coupled to first and second antennas 110a, 112a, while a second wireless communication frontend module 502b is electrically coupled to third and fourth antennas 110b, 112b. The antenna diversity system 500 also includes a switch assembly 504 that electrically couples the output of the wireless communication frontend modules 502a, 502b to a wireless communication baseband module 506 that in turn, is coupled to the one or more applications 614. Thus, whereas the switch assembly 404 of the antenna diversity system 400 of FIG. 4 selectively switches electrical carrier frequency signals between the antennas 110, 112 and wireless communication module 402, the switch assembly 504 of the antenna diversity system 500 may selectively switch electrical baseband signals between the wireless communication frontend modules 502a, 502b and the applications 614.

Certain embodiments of the antenna diversity system 400 as shown in FIG. 4 or the antenna diversity system 500 of FIG. 5 may exhibit certain advantages. For example, the antenna diversity system 400 may only require a single wireless communication module 402 for its operation, while requiring a switch assembly 404 that switches electrical signal at the RF carrier frequency level. On the other hand, the antenna diversity system 500 of FIG. 5 may provide dedicated wireless communication frontend modules 502a, 502b for each redundant pair of antennas 110, yet allow implementation of a switch assembly 504 that is is used to convey baseband level signaling.

Each of the two wireless communication frontend modules 502a, 502b and wireless communication baseband module 506 collectively provide similar functionality to the wireless communication module 402 as described above with reference to FIG. 4. Additionally, with the exception of being adapted to convey baseband level signaling, certain features of the switch assembly 504 are similar in design and function to the switch assembly 404 of FIG. 4. For example, the switch assembly 504 generally includes a pair of two-pole, double-throw (SPDT) switches that may be independently controlled by the wireless communication controller 604 to select either antenna used for the first band of operation (e.g., first or third antenna), or the second band of operation (e.g., second or fourth antenna). Additionally, the output of the switch assembly 504 is fed to the software system 600 to be used thereby.

Figure 6:
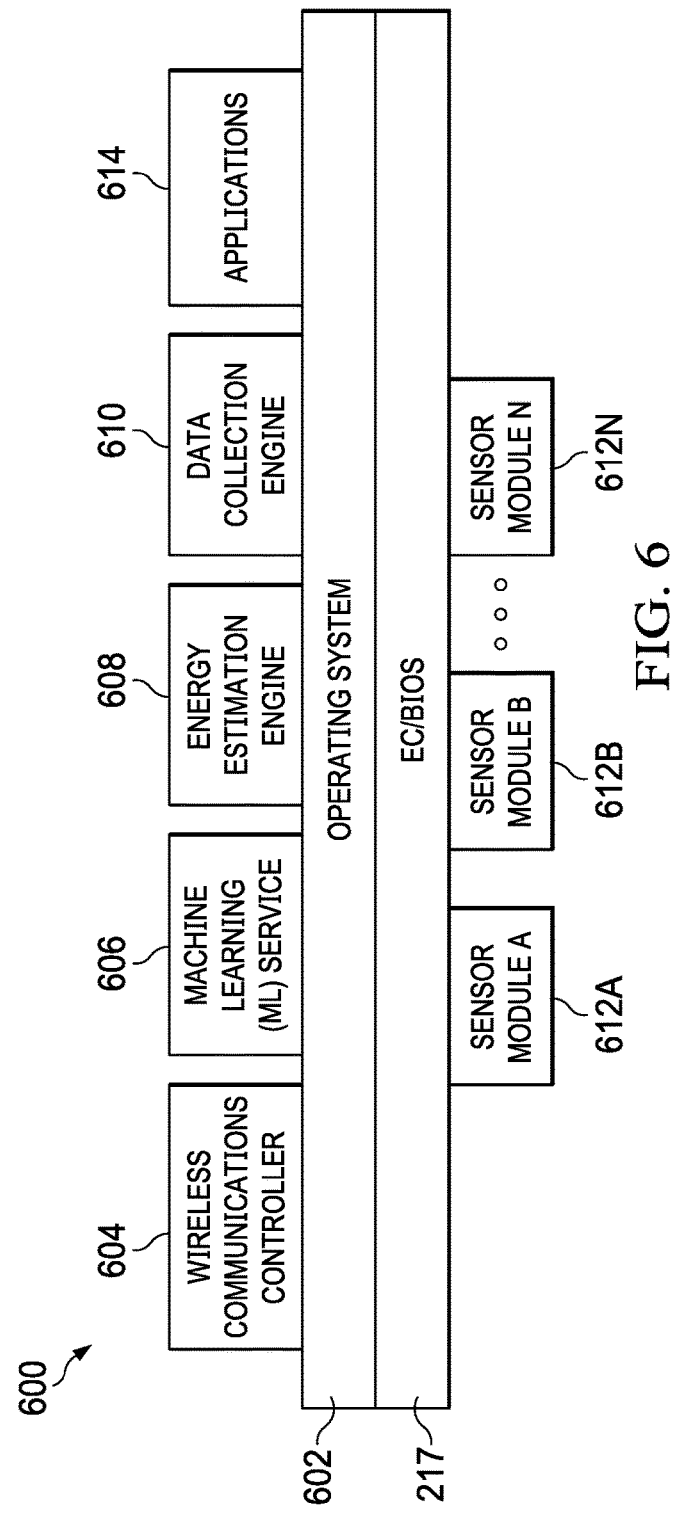
FIG. 6 is a block diagram illustrating an example of a software system that may be produced by the AIO computer for providing the antenna diversity system according to one embodiment of the present disclosure.

FIG. 6 is a block diagram illustrating an example of a software system 600 that may be produced by the AIO computer 100 for providing the antenna diversity system according to one embodiment of the present disclosure. In some embodiments, each element of software system 600 may be provided by AIO computer 100 through the execution of program instructions by one or more logic components (e.g., CPU 201, BIOS 217, EC 220, etc.) stored in memory (e.g., system memory 205), storage device(s) 219, and/or firmware. As shown, software system 600 includes an operating system (OS) 602 that supports a wireless communications controller 604, machine learning (ML) service 606, an energy estimation engine 608, a data collection engine 610, and one or more applications 614 (e.g., web browser, email client, web streaming service, etc.) that accesses or uses the wireless communications link provided by the antenna diversity system. Software system 600 may also include one or more sensor modules or drivers 612A-612N, which may abstract and/or interface with sensors configured on the monitor 106 to detect its movement.

In one embodiment, ML service 606 may include features, or form a part of, the DELL PRECISION OPTIMIZER. The DELL PRECISION OPTIMIZER dynamically configures the AIO computer 100 to optimize its performance. It also keeps the user informed of any available software updates and applies them when configured to do so. Additionally, it may include a tracking subsystem that can gather data about the AIO computer 100 and help identify potential problems. In one embodiment, ML service 606 may be provided as a cloud service in which it communicates through a publicly available communication network, such as the Internet, to communicate with the AIO computer 100 and its associated resources and sensors 612A-612N for selection of which of the antennas 110, 112 are to be used for providing the wireless communications between the AIO computer 100 and AP 122. For example, the antenna diversity system may be provided as a subscription service, in which users of AIO computer 100 may register for providing the various features described herein.

In various embodiments, software system 600 also includes an energy estimation engine 608, such as the MICROSOFT E3 engine, which is configured to provide energy usage data broken down by applications, services, tasks, and/or hardware in an IHS. In some cases, energy estimation engine 608 may use software and/or hardware sensors configured to determine, for example, whether an application is being executed to access the wireless communications provided by the antenna diversity system 102, and if so, how much processing capacity and/or electrical power is used by the wireless communication module.

Data collection engine 610 may include any data collection service or process, such as, for example, the DELL DATA VAULT configured as a part of the DELL SUPPORT CENTER that collects information on system health, performance, and environment. In some cases, data collection engine 610 may receive and maintain a database or table that includes information related to IHS hardware utilization, such as wireless communication module usage, IHS software utilization (e.g., applications that may use the wireless communication services provided by antenna diversity system 102, and the like.

In general, ML service 606 gathers telemetry data from the sensors 612A-612N, energy estimation engine 608, data collection engine 610, and/or applications 614 to characterize their behavior. For example, ML service 606 may generate one or more performance features from telemetry data gathered from energy estimation engine 608, data collection engine 610, applications 614, and/or directly from sensors 6121-612N configured in AIO computer 100 to generate one or more profile recommendations associated with the performance of the wireless communication system. Once ML service 606 has collected characteristics over a period of time, it may then process the collected data using statistical descriptors to extract the application performance features of the antenna diversity system 102. For example, ML service 606 may monitor various resources over time to estimate its resource usage with respect to various aspects, such as which actions performed by AIO computer 100 cause the antenna diversity system to encounter loading, and a time period of day in which these actions are encountered.

Once ML service 606 has collected characteristics over a period of time, it may then process the collected data using statistical descriptors to extract the performance features associated with AIO computer 100. From these performance features, the ML service 606 may generate profile recommendations that are used to optimize operation of the antenna diversity system 102. ML service 606 may use any suitable AI-based learning algorithm such as, for example, a Bayesian algorithm, a Linear Regression algorithm, a Decision Tree algorithm, a Random Forest algorithm, a Neural Network algorithm, or the like.

For example, the ML service 606 may learn, via ongoing acquisition of telemetry data, that the user adopts a first sitting or standing posture during the morning hours that causes the first set of antennas 110a, 110b to be obstructed more than the second set of antennas 112a, 112b; and conversely, the user adopts a second sitting or standing posture during the afternoon hours that causes the first set of antennas 110a, 110b to be less obstructed more than the second set of antennas 112. Given this learned behavior, the ML service 606 may generate one or more profile recommendations that causes the wireless communications controller 604 to weight the selection towards the second set of antennas 112a,112b during the morning hours, and weight the selection towards the first set of antennas 110a, 110b during the afternoon hours. As another example, the ML service 606 may learn that a certain application 614 causes a relatively larger level of data through the wireless communication link, and therefore, may generate one or more profile recommendations for the wireless communication controller 604 to perform measurements of signal strength through each of the antennas 110, 112 at a relatively faster rate.

Figure 7:
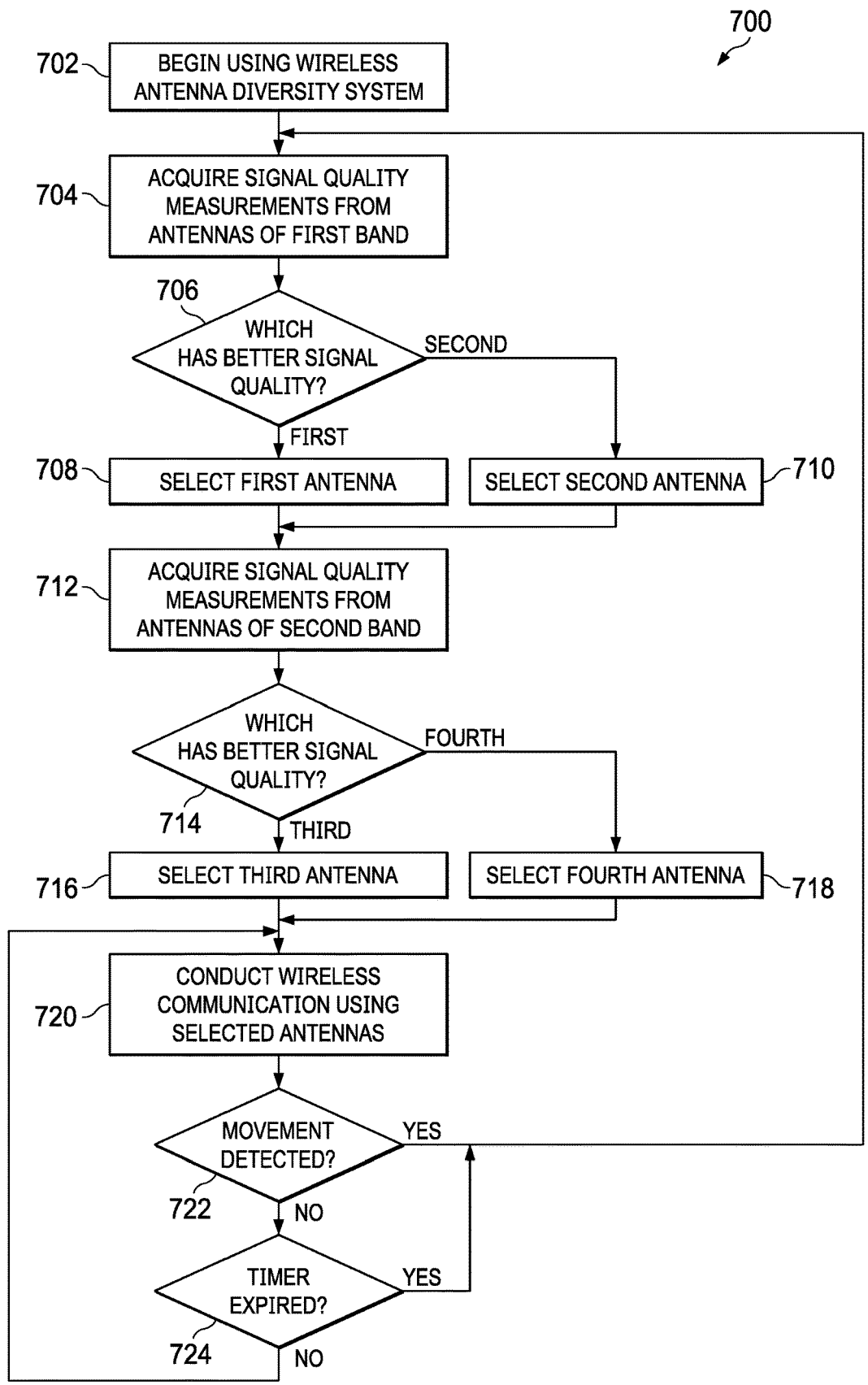
FIG. 7 is an example method that may be performed for selecting antennas to be used in a wireless communication system according to one embodiment of the present disclosure.

FIG. 7 is a example method 700 that may be performed for selecting antennas to be used in a wireless communication system according to one embodiment of the present disclosure. In certain embodiments, the method 700 may be performed at least in part, by wireless communication controller 604. The foregoing description is based on a 4:2 diversity scheme in two communication bands configured with two alternative antennas 110, 112. Nevertheless, alternative embodiments of the method 700 may be practiced with any desired diversity scheme. Additionally, while the foregoing description is directed to an AIO computer 100, it should be understood that embodiments of the method 700 may be directed to any IHS for which a wireless communication system involving an antenna diversity scheme is desired.

Initially, the AIO computer 100 may be started (e.g., OS 602 bootstrapped by system BIOS 217) in the normal manner. When the AIO computer 100 is started, wireless communication controller 604 may also be launched automatically after OS 602 has been initially started, such as when OS 602 is started (e.g., bootstrapped) by system BIOS 217. In another embodiment, wireless communication controller 604 may be started manually, such as in response to user input. In yet another embodiment, if ML service 606 is configured as a cloud service, it may be started by receiving a request message from AIO computer 100 to the cloud service followed by sending a response message to AIO computer 100 for initiating a communication channel between AIO computer 100 and the cloud service.

At step 702, the wireless communication system of the AIO computer 100 begins to be used. For example, the AIO computer 100 may receive user input for establishing a wireless communication with the AP 122 or other suitable wireless communication device. At this point, the method 700 establishes the wireless communication with a default set of antennas 110. For example, the method 700 may initially select the first and second antennas 110, 112 configured proximate the top of the monitor stand 104 to convey the wireless communication session.

At step 704, the method 700 acquires signal quality measurements from the antennas 110a, 112a associated with the first communication band. Any signal quality measurement may be acquired. In one embodiment, the method 700 may acquire a received signal strength (RSS) measurement indicating an amplitude of the received signal as seen at each antenna 110a, 112a. Other signal quality measurements may be obtained, such as quality of service (QoS) measurements, bit error rate (BER) of the baseband signal, packet rate, transmission delay, and the like. Thereafter at step 706, the method 700 determines which antenna exhibits the best signal quality. If the first antenna 110 exhibits the best signal quality processing continues at step 708 to select the first antenna 110a; otherwise, processing continues at step 710 to select the second antenna 112a. It is important to note that, since the first and second antennas 110a, 112a are spatially separated from one another (e.g., top of monitor stand versus bottom of monitor stand 104), one antenna may necessarily possess better signal quality than its counterpart due to the current position of the monitor or other device that may exist between the antennas and the AP 122.

At step 712, the method 700 acquires signal quality measurements from the third and fourth antennas 110b, 112b associated with the second communication band. Thereafter at step 714, the method 700 determines which antenna 110b, 112b exhibits the best signal quality. If the third antenna 111b exhibits the best signal quality processing continues at step 716 to select the third antenna 110b; otherwise, processing continues at step 718 to select the fourth antenna 112b. The selection process for the third and fourth antennas 110b, 112b are performed similarly to how the first and second antennas 110a, 112a are selected by the method 700.

At this point, wireless communications are conducted in the normal manner between the AIO computer 100 and AP 122 using the antennas selected above at step 720.

At step 722, the method 700 determines whether movement of the monitor 106 of the AIO computer 100 is detected. For example, the method 700 may continually monitor sensors configured on the monitor stand 104 that detect whenever the monitor's height is adjusted (e.g., moved up or down), is swiveled (e.g., rotated left or right), tilted (e.g., rotated up or down), and/or pivoted (e.g., orientation of the monitor changed between landscape/portrait mode). If the method 700 detects, via the sensors, that the monitor has been moved or adjusted, the method 700 continues processing at step 704 to again select antennas for each communication band that provides the best signal quality. In one embodiment, the method 700 may wait for a certain period of time (e.g., 2 seconds) after detection of monitor movement so that any transient activity occurring directly following movement of the monitor can stabilize so that accurate measurements of the signal quality of each antenna can be properly ascertained.

If, however, the method 700 does not detect any movement of the monitor 106 at step 722, processing continues at step 724 in which it determines whether a measurement cycle timer has expired. The measurement cycle timer is used to continually cause the method 700 to repeatedly select the best antennas 110, 112 at ongoing intervals during use of the wireless communication. Even if the monitor is not moved over a given time period, other objects in close proximity to the antennas may adversely affect the propagation pattern produced thereby. For example, a conductive object, such as a metal plate, or a desk trinket may be inadvertently placed close to the monitor stand so the that propagation pattern of one or more of the antennas is adversely affected. As another example, a user or other person may move in front of, or in between certain of the antennas such that, although the monitor has not been moved, the propagation pattern of those antennas may be adversely affected. Accordingly, the measurement cycle timer may be used for continually monitor the signal quality generated by each antenna and selecting those antennas that provide the best signal quality for the wireless communication session.

In one embodiment, the elapsed time of the measurement cycle timer may be adjusted according to one or more criteria, such as ambient RF noise conditions obtained from the sensors, a level of activity of the wireless communication session (e.g., data throughput), a time of day (e.g., morning, lunchtime, afternoon, nighttime, etc.). For example, the method 700 may adjust the elapsed time of the measurement cycle timer to be approximately 30 minutes during the nighttime hours, and adjust the elapsed time to be approximately 2 seconds during the day when users may be actively using the AIO computer 100.

In another embodiment, the elapsed time of the measurement cycle timer may be adjusted as a result of one or more profile recommendations provided by ML service 606. For example, the ML service 606 may estimate that, due to launching (e.g., starting) a particular application 614 or a certain combined group of applications 614, the data throughput of the wireless communication may increase to a level such that increased monitoring of the signal quality provided by each of the antennas may be beneficial. For another example, the ML service 606 may estimate that when certain behavioral patterns are exhibited by the user of the AIO computer 100, the noisiness of the RF signal, the bit error rate increases, or other factor may increase to a level that warrants increased monitoring of each antenna's signal quality. As such, the ML service 606 may be used to aid in adjusting a measurement cycle timer so that the resulting signal quality and data throughput of the wireless communication are enhanced based on the behavior patterns estimated by the ML service 606.

The previously described method 700 is repeatedly performed for ongoing selection of one or more antennas from among multiple available antennas in a wireless communication session. Nevertheless, when use of the antenna diversity system is no longer needed or desired, the method 700 ends.

Although FIG. 7 describes one example of a method 700 that may be performed for selecting a group of antennas from among multiple available antennas in a wireless communication session, the features of the disclosed method 700 may be embodied in other specific forms without deviating from the spirit and scope of the present disclosure. For example, the method 700 may perform additional, fewer, or different operations than those operations as described in the present example. As another example, the steps of the method 700 described herein may be performed by a computing system other than the AIO computer 100, such as via a cloud service as described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a housing comprising a monitor stand for supporting a monitor, wherein the monitor is constrained within an adjustable position that is configured to at least partially hinder a radio frequency (RF) radiation pattern of one of a first or second antenna disposed within the monitor stand;
at least one processor configured in the housing; and
at least one memory configured in the housing and coupled to the at least one processor, the at least one memory having program instructions stored thereon that, upon execution by the at least one processor, cause the IHS to:
receive a first signal quality measurement from the first antenna disposed at a first location in the housing;
receive a second signal quality measurement from the second antenna disposed at a second location in the housing, wherein the first location is distally separated from the second location;
select one of the first or second antennas according to the first or second signal quality measurement; and
establish a first wireless communication link with a remote device using the selected first or second antenna.

2. The IHS of claim 1, wherein the housing and the monitor comprises an all-in-one (AIO) computer.

3. The IHS of claim 1, wherein the wireless communication conforms to a Wi-Fi wireless protocol.

4. The IHS of claim 1, wherein the instructions are further executed to:
receive a third signal quality measurement from a third antenna disposed at a third location in the housing;
receive a fourth signal quality measurement from a fourth antenna disposed at a fourth location in the housing, wherein the fourth location is distally separated from the third location;
select one of the third or fourth antennas according to the third or fourth signal quality measurement; and
establish a second wireless communication link with a remote device using the selected third or fourth antenna.

5. The IHS of claim 4, wherein the first and second wireless communication links comprises communication bands of a Wi-Fi protocol.

6. The IHS of claim 1, wherein the first, second, third, and fourth antennas comprise a 4:2 antenna diversity scheme.

7. The IHS of claim 1, wherein at least one of the antennas comprises a trace formed on a printed circuit board.

8. The IHS of claim 1, wherein at least one of the antennas comprises a layer of conductive material formed by a laser direct structuring (LDS) process.

9. The IHS of claim 1, wherein the instructions are further executed to:
measure the first and second signal quality measurements at ongoing intervals; and
adjust an elapsed time of each ongoing interval according to a detected activity level of the first wireless communication link.

10. The IHS of claim 9, wherein the instructions are further executed to trigger measurement of the first and second signal quality measurements when a movement of a monitor is detected, wherein:
the housing comprises a monitor stand for supporting the monitor; and
the monitor is constrained within an adjustable position that is configured to at least partially hinder a radio frequency (RF) radiation pattern of one of the first or second antennas.

11. The IHS of claim 9, wherein the instructions are further executed to adjust the elapsed time using a machine learning (ML) process.

12. A method comprising:
receiving, using instructions stored in at least one memory and executed by at least one processor, a first signal quality measurement from a first antenna disposed at a first location in a housing comprising a monitor stand for supporting the monitor, wherein the monitor is constrained within an adjustable position that is configured to at least partially hinder a radio frequency (RF) radiation pattern of one of a first or second antenna disposed within the monitor stand, wherein the housing houses the at least one memory and the at least one processor;

receive a second signal quality measurement from a second antenna disposed at a second location in the housing, wherein the first location is distally separated from the second location;

select one of the first or second antennas according to the first or second signal quality measurement; and establish a first wireless communication link with a remote device using the selected first or second antennas.

13. The method of claim 12, further comprising:

receiving a third signal quality measurement from a third antenna disposed at a third location in the housing;

receiving a fourth signal quality measurement from a fourth antenna disposed at a fourth location in the housing, wherein the fourth location is distally separated from the third location;

selecting one of the third or fourth antennas according to the third or fourth signal quality measurement; and establishing a second wireless communication link with a remote device using the selected third or fourth antenna.

14. The method of claim 12, further comprising:

measuring the first and second signal quality measurements at ongoing intervals; and adjusting an elapsed time of each ongoing interval according to a detected activity level of the first wireless communication link.

15. The method of claim 14, further comprising triggering measurement of the first and second signal quality measurements when a movement of a monitor is detected, wherein, the housing comprises a monitor stand for supporting the monitor; and the monitor is constrained within an adjustable position that is configured to at least partially hinder a radio frequency (RF) radiation pattern of one of the first or second antennas.

16. The method of claim 14, further comprising adjusting the elapsed time using a machine learning (ML) process.

17. A memory storage device having program instructions stored thereon that, upon execution by one or more processors of an Information Handling System (IHS), cause the IHS to:

receive a first signal quality measurement from a first antenna disposed at a first location in a housing comprising a monitor stand for supporting the monitor, wherein the monitor is constrained within an adjustable position that is configured to at least partially hinder a radio frequency (RF) radiation pattern of one of a first or second antenna disposed within the monitor stand;

receive a second signal quality measurement from a second antenna disposed at a second location in the housing, wherein the first location is distally separated from the second location;

select one of the first or second antennas according to the first or second signal quality measurement; and establish a first wireless communication link with a remote device using the selected first or second antenna.

18. The memory storage device of claim 17, wherein the housing and the monitor comprises an all-in-one (AIO) computer.

* * * * *